May 17, 1949.  C. H. PARMELEE ET AL  2,470,638
APPARATUS FOR WORKING PLASTIC MATERIAL
Filed Dec. 14, 1945  9 Sheets-Sheet 1
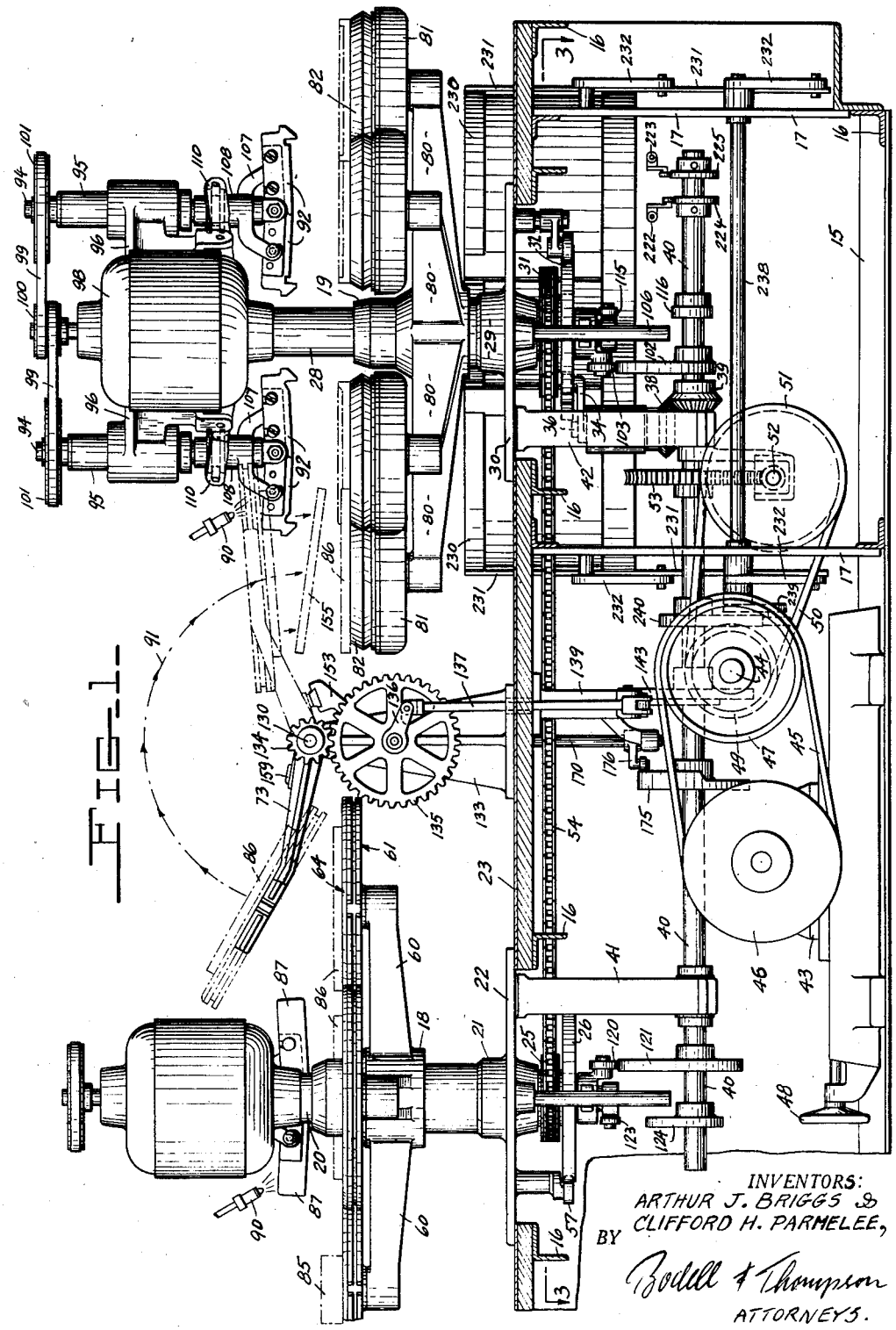
INVENTORS:
ARTHUR J. BRIGGS &
CLIFFORD H. PARMELEE,
BY
ATTORNEYS.

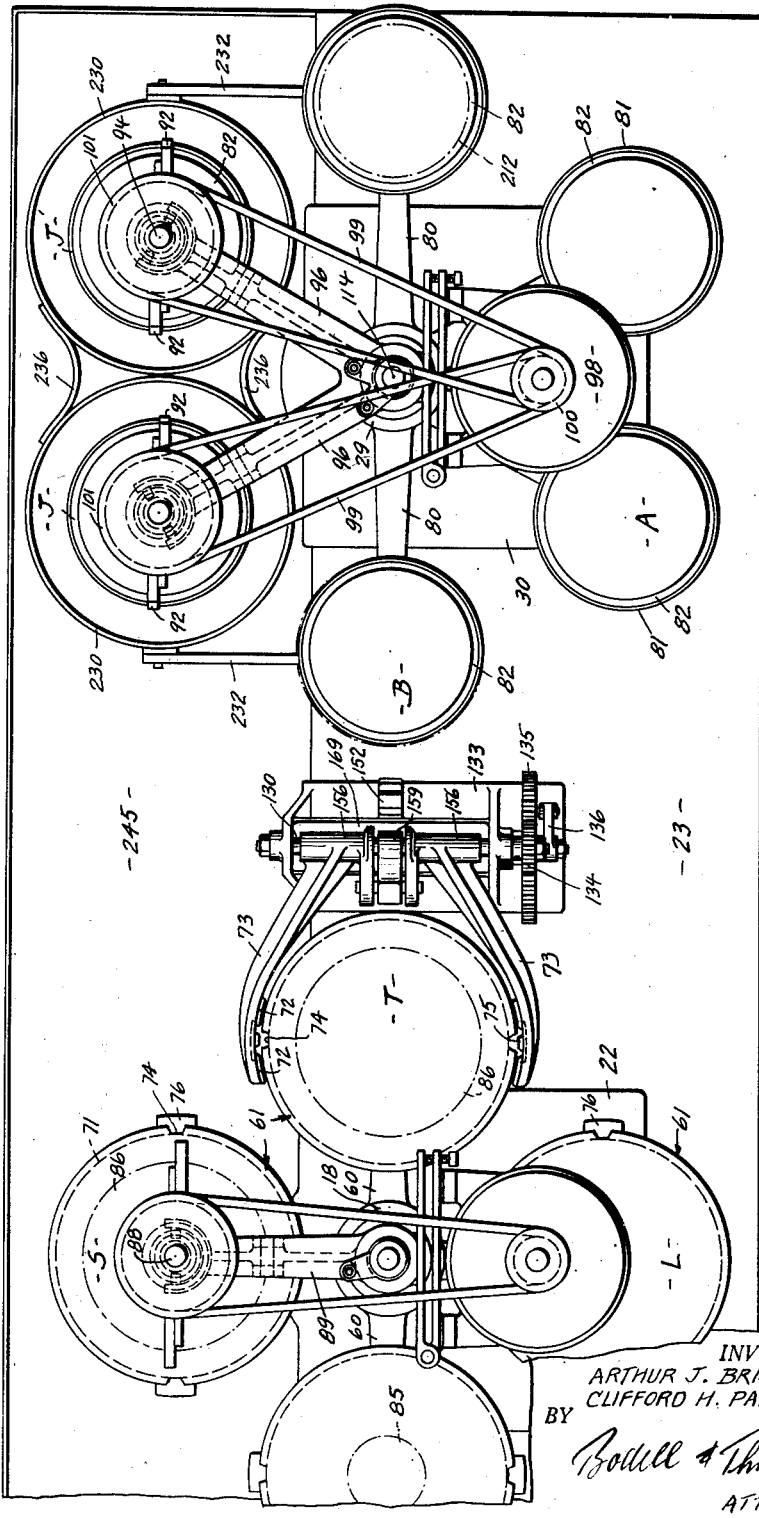

May 17, 1949.  C. H. PARMELEE ET AL  2,470,638
APPARATUS FOR WORKING PLASTIC MATERIAL
Filed Dec. 14, 1945  9 Sheets-Sheet 3
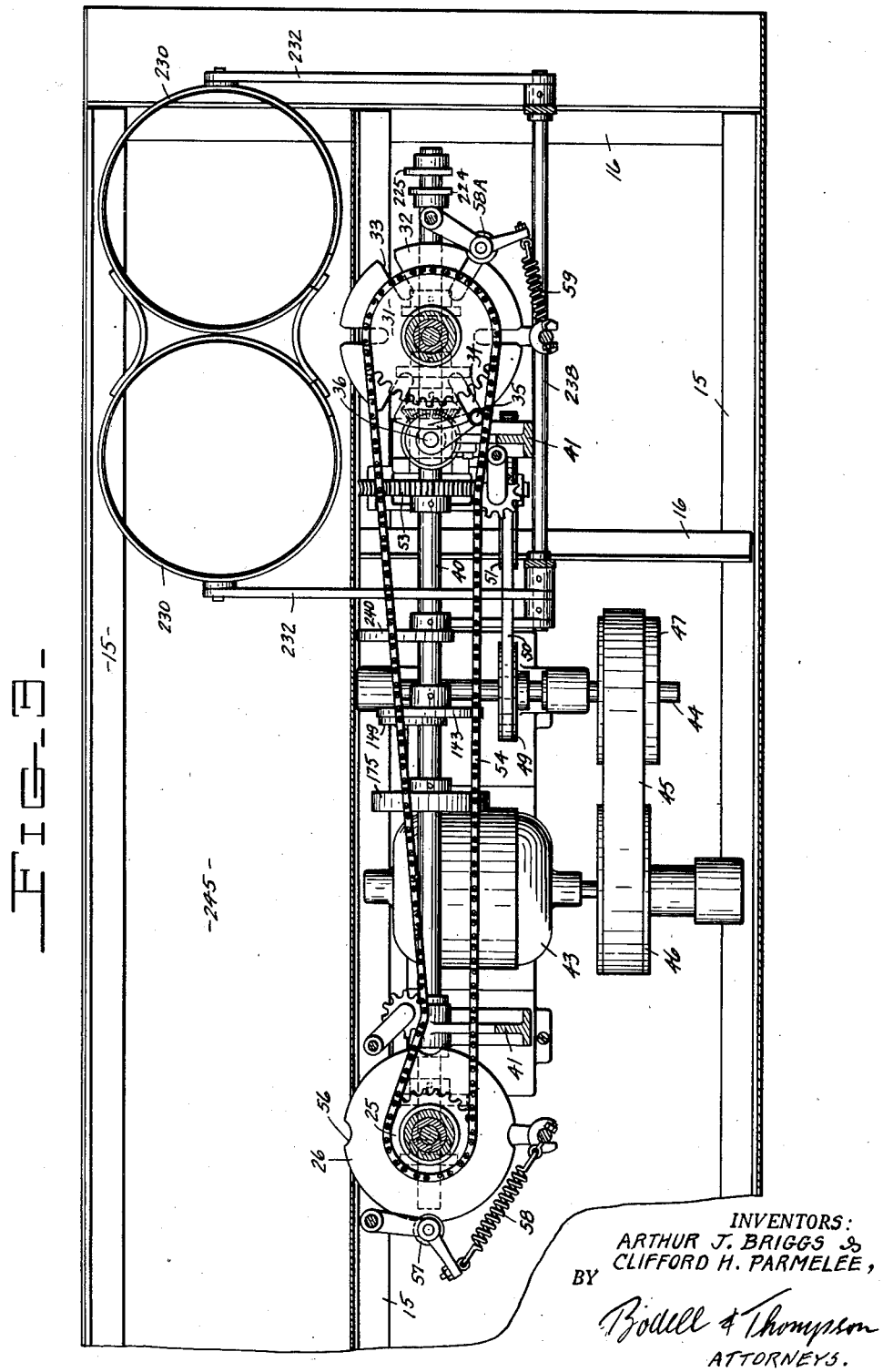
INVENTORS:
ARTHUR J. BRIGGS &
CLIFFORD H. PARMELEE,
BY Bodell & Thompson
ATTORNEYS.

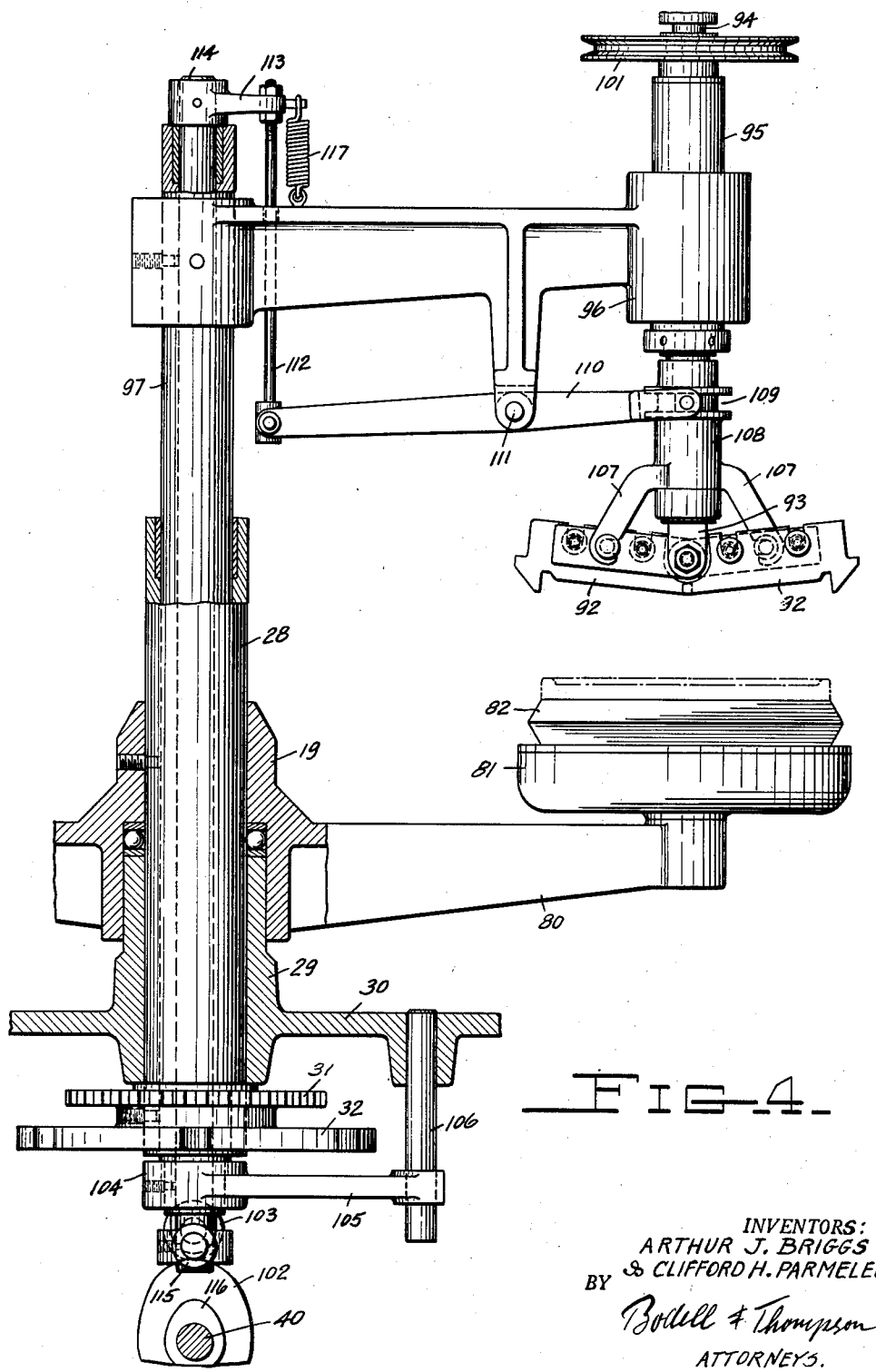

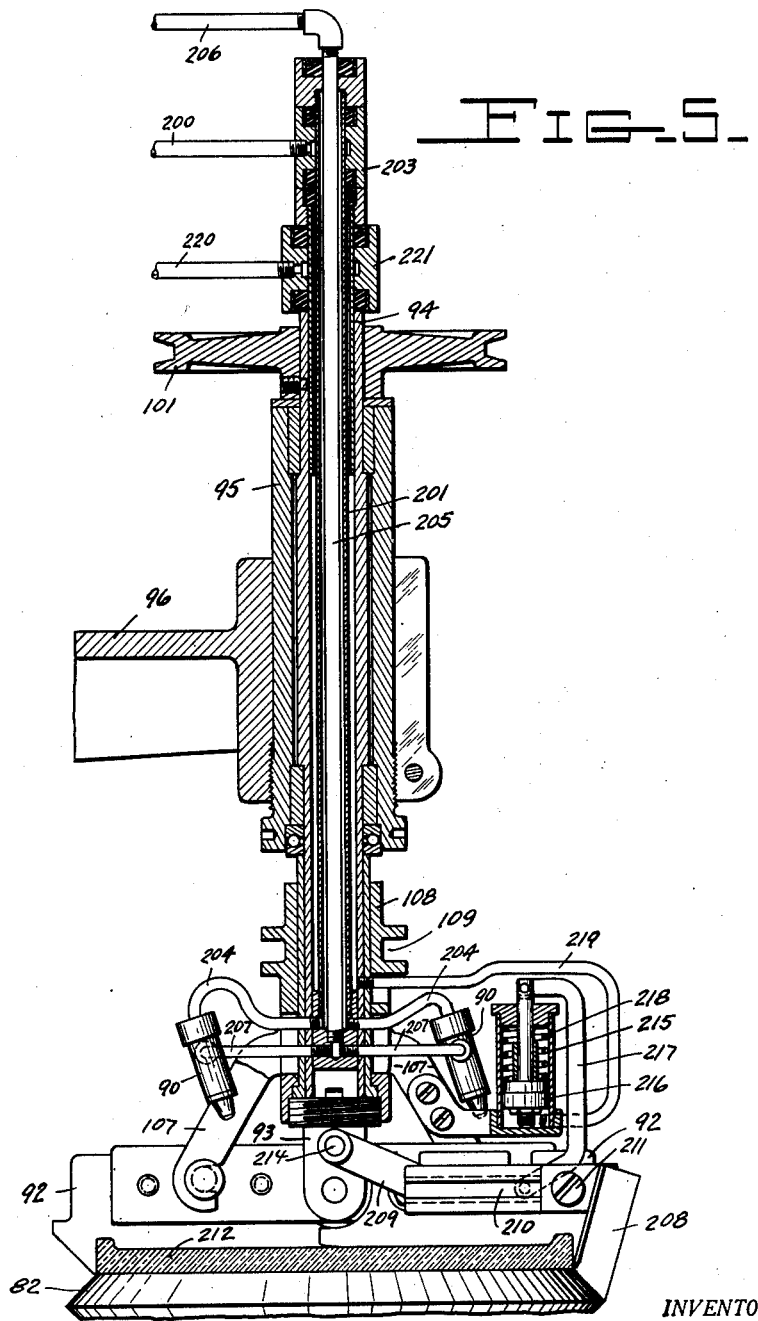

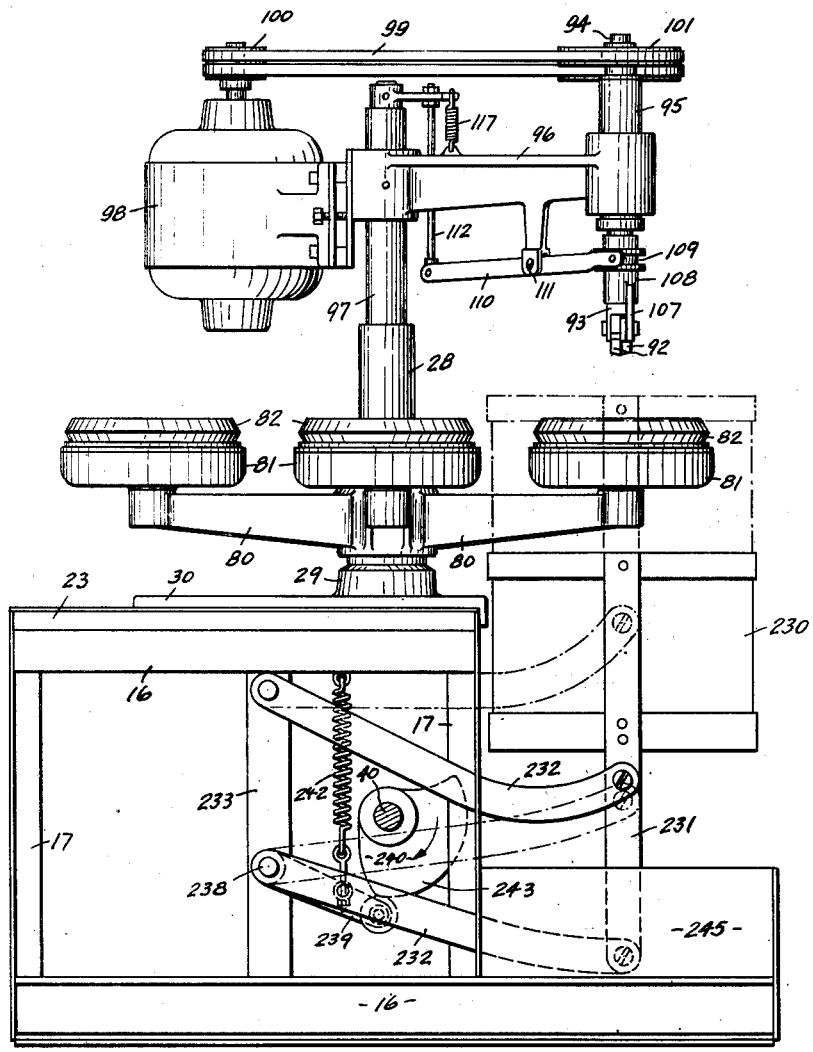

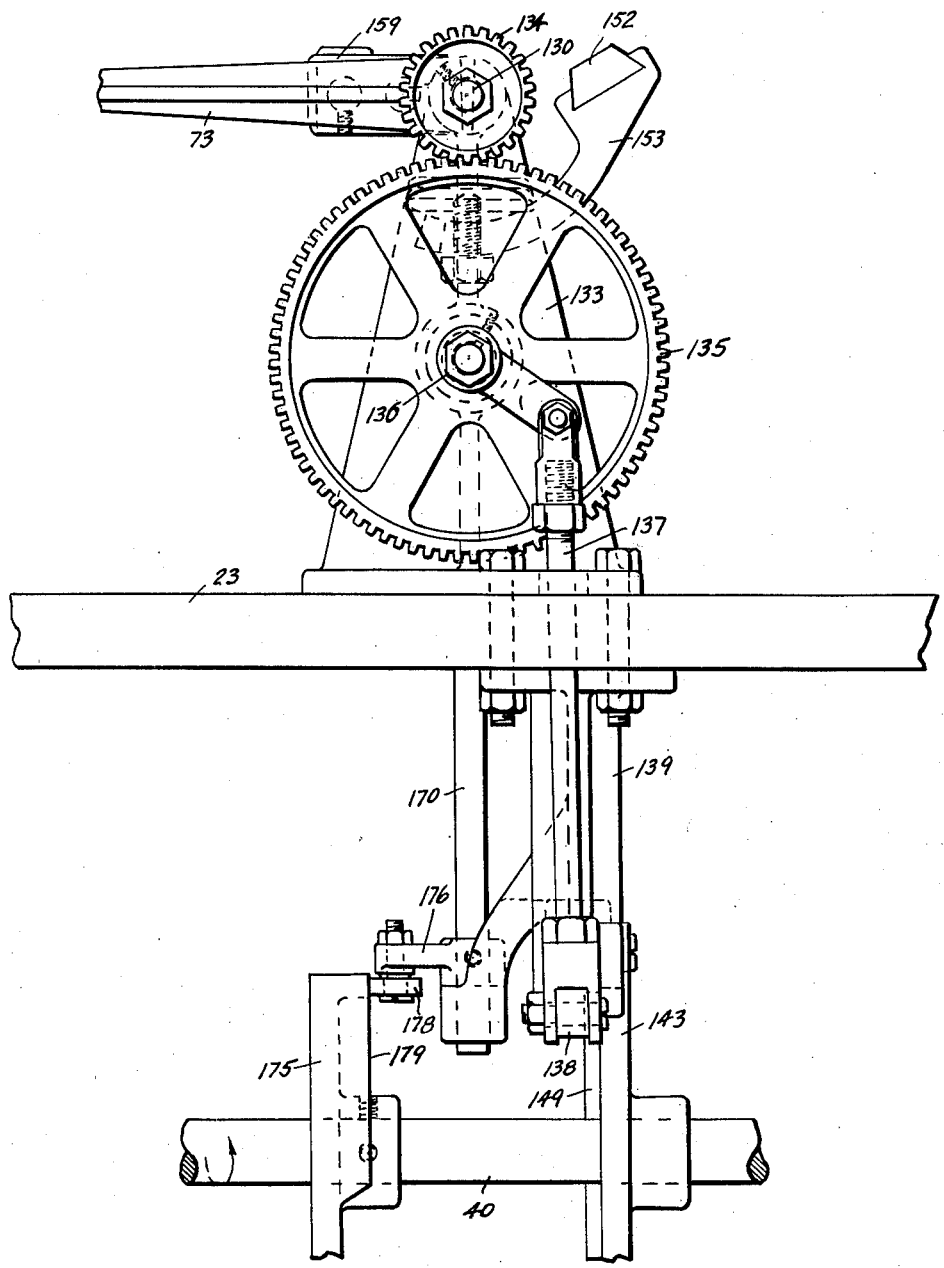

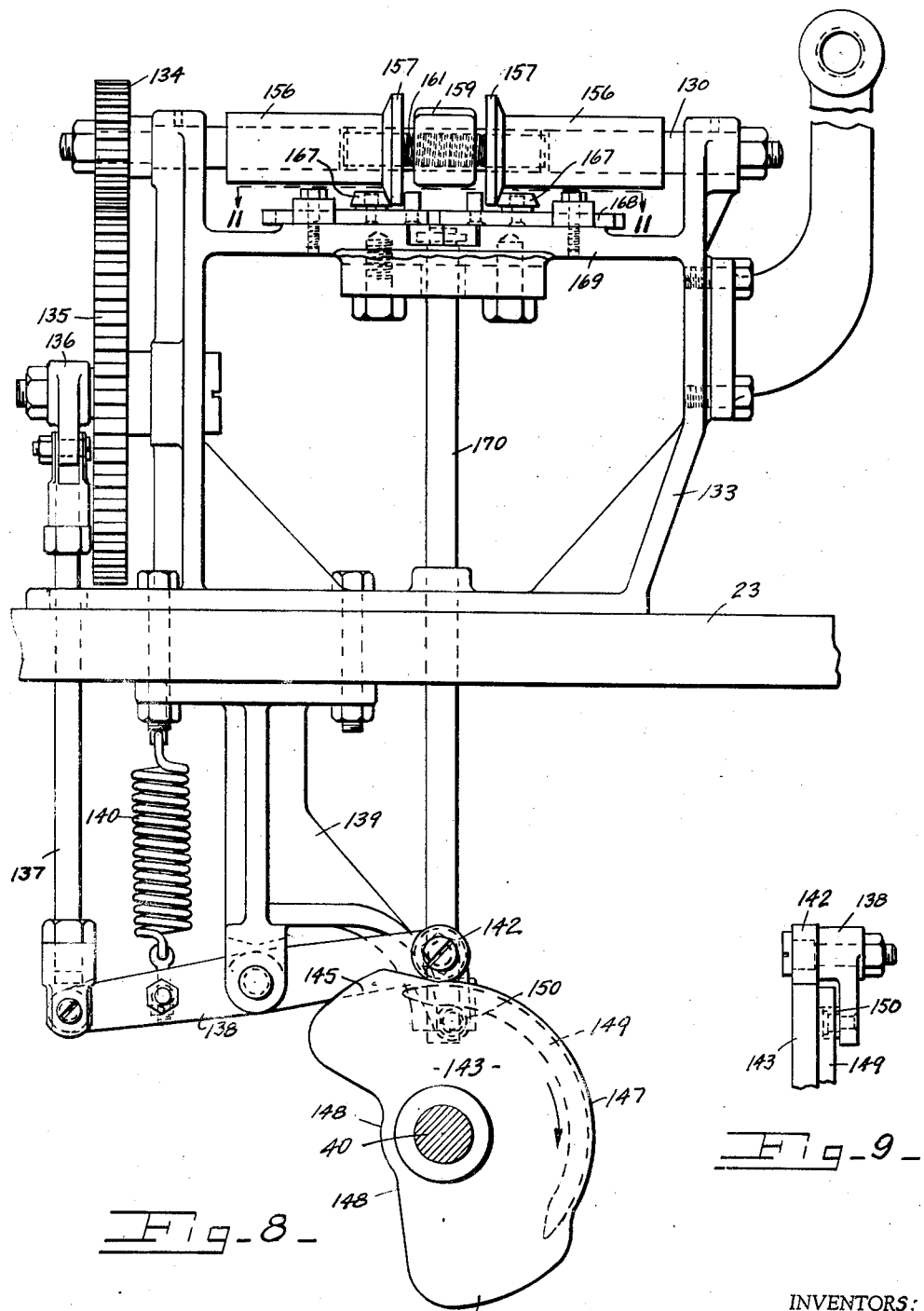

May 17, 1949.  C. H. PARMELEE ET AL  2,470,638
APPARATUS FOR WORKING PLASTIC MATERIAL
Filed Dec. 14, 1945  9 Sheets-Sheet 9

INVENTORS:
ARTHUR J. BRIGGS &
CLIFFORD H. PARMELEE,
BY Bodell & Thompson
ATTORNEYS.

Patented May 17, 1949

2,470,638

UNITED STATES PATENT OFFICE 2,470,638

APPARATUS FOR WORKING PLASTIC MATERIAL

Clifford H. Parmelee and Arthur J. Briggs, Syracuse, N. Y., assignors to Onondaga Pottery Company, Syracuse, N. Y., a corporation of New York Application December 14, 1945, Serial No. 634,926

10 Claims. (Cl. 25—24)

This invention relates to a machine for forming articles from plastic material, such as the forming of dinner ware from plastic clay.

The invention has as an object a power operated machine which functions to spread a blank of clay to substantially flat disk formation resembling a pie-crustlike bat, automatically transferring and inverting the formed bat onto the surface of a mold, and subsequently jiggering the bat. These various operations are performed automatically in timed relation, it being only necessary for the operator to place a blank or lump of clay on the machine and remove molds from the machine with the clay thereon jiggered to form.

Heretofore, dinner ware and the like have been formed almost entirely by spreading a clay blank to flat disk form, the disk being known as a "bat." The bat is transferred, or thrown manually, onto a mold in a jiggering machine, and the bat is jiggered by a manual operation. The transfer or throwing of the bat onto the mold, and the subsequent jiggering operation, requires a considerable degree of skill.

Our machine incorporates means for transferring the bat to the surface of the mold in a manner simulating that of the manual transfer. This transfer is so effected that one side, or portion of the bat adjacent the periphery thereof, first contacts the mold, and the remaining portion progressively engages the surface of the mold, whereby air is excluded between the bat and the mold, and the bat properly engages the surface of the mold so that said surface is reproduced in the ware without blemishes, or other defects.

The invention has as a further object, rotary spreading and jiggering mechanisms embodying a novel arrangement for actuating the clay engaging tools to effect a rapid and efficient tooling of the clay without producing blemishes, or defects, which usually occur in using rotatable tools in combination with a stationary mold.

In our machine the spreading, bat transferring and jiggering operations, are performed while the operator is placing the clay blanks on the machine and removing the molds with the jiggered ware thereon, and placing empty molds in the machine, all whereby the operator is able to materially increase his production.

The invention consists in the novel features and in the combinations and constructions hereinafter set forth and claimed.

In describing this invention, reference is made to the accompanying drawings in which like characters designate corresponding parts in all the views.

Figure 1 is a side elevational view of the machine with parts of the frame shown in section.

Figure 2 is a top plan view of the machine.

Figure 3 is a view, taken on line 3—3, Figure 1.

Figure 4 is an enlarged side elevational view of the jiggering mechanism with parts shown in section.

Figure 5 is a vertical sectional view of a modified form of jiggering mechanism, and structure carried thereby, for applying lubricant to the ware during the jiggering operation.

Figure 6 is an end elevational view of the machine.

Figure 7 is an end elevational view of the mechanism for moving the bat transfer members.

Figure 8 is a side elevational view of the mechanism shown in Figure 7.

Figure 9 is a fragmentary view of the cam follower structure shown in Figures 7 and 8.

Figure 10:
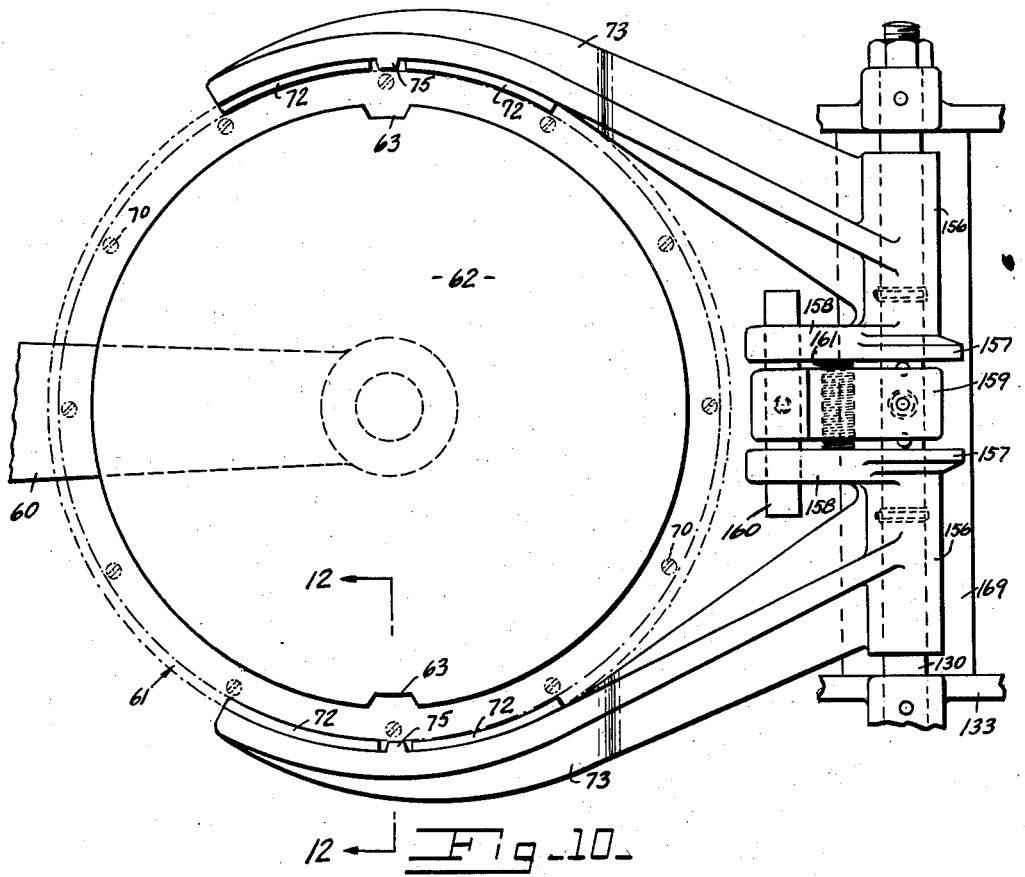
Figure 10 is a top plan view of a transfer member support and carrying arms.

The spreading and jiggering mechanisms are mounted on a suitable frame or cabinet formed of lengthwise extending members 15 and various cross members 16, and vertically extending members 17, see Figure 1. A spreading turret 18 is journalled in proximity to one end of the frame, and a jiggering turret 19 is positioned in proximity to the opposite end of the frame. The turret 18 is secured to a hollow shaft 20 vertically journalled in a boss 21 extending upwardly from a supporting plate 22 which is mounted over an aperture in the top 23 of the frame. A sprocket 25 and a disk 26 are secured to the lower end of the shaft 20.

The turret 19 is secured to a similar shaft 28 vertically journalled in the upwardly extending boss 29, Figures 1 and 4, of plate 30, likewise positioned over an aperture in the frame top 23. The shaft 28 is provided, on its lower end, with a sprocket 31 and a disk 32. This disk is provided with six equally spaced slots 33, and the disk constitutes a Geneva which is intermittently rotated by a crank 34 having a roller 35 at its outer end for engaging the slots 33. The crank 34 is mounted upon the upper end of a vertically journalled shaft 36, the lower end of which is provided with a bevel gear 38 engaging a similar gear 39 secured to a main operating shaft 40 extending lengthwise of the frame, and journalled in bearing brackets 41, 42, depending from the plates 22 and 30. The shaft 40 constitutes the main drive shaft of the machine and it is operated by a motor 43 which is operatively connected to a transversely extending shaft 44 through the instrumentality of a belt 45 trained over pulleys 46, 47. The pulley 46 is of the V type with the outer side of the pulley spring pressed toward the inner side whereby when the motor is moved toward and from the shaft 44 by wheel 48, the speed of the shaft 44 is varied. The shaft 44 is provided with a pulley 49 and, by means of belt 50, drives a pulley 51 mounted upon a second transversely extending shaft 52 which is provided with a worm engaging a worm wheel 53 secured to the shaft 40, whereby the shaft 40 is constantly rotated and the turret 19 periodically indexed about the axis of shaft 28.

The turret 18 is likewise indexed in timed relation to the turret 19 through the chain 54 trained over the sprockets 25, 31.

The disk 26 is formed, in its periphery, with a plurality of notches 56, there being one of these notches for each indexed position, and the notches are engaged by a detent 57 urged towards the axis of the disk by spring 58, see Figure 3. The outer end of the slots 33, in disk 32, are likewise engaged by a detent 58—A urged inwardly by spring 59. The purpose of the detents 57, 58—A, is to accurately position the turrets 18, 19, at the end of each indexing movement. The turret 18 is provided with radially extending arms 60 which serve as carriers for transfer members 61.

Figure 12:
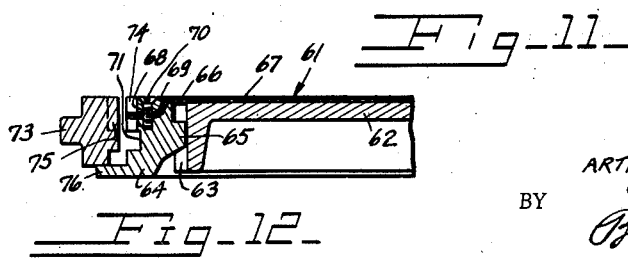
Figure 12 is a fragmentary sectional view taken on line 12—12, Figure 10.

A circular pad 62, see Figures 10 and 12, is mounted on the outer end of each of the arms 60, and is formed in its periphery with diametrically opposed notches 63. The transfer member consists of a ring 64 formed with inwardly extending projections 65 complemental to the notches 63. A screen 66 is mounted upon the ring 64, and a disk of fabric material 67, such as chamois, is superimposed upon the screen 66. An annular clamping member 68 is cooperable with the marginal portion of the screen and fabric 66, 67, to secure the same to the ring 64. This ring is formed with an upwardly extending annular edge 69, and over which the marginal portion of the screen and fabric is drawn by the clamping ring 68 when screws 70 are tightened, this serving to draw the screen and fabric more or less taut.

The periphery of the ring member 64 is formed with a circumferential groove 71 to receive inwardly extending arcuate projections 72 on transfer arm 73. The rings 64, 68, are also formed with diametrically opposed notches 74 to receive corresponding projections 75 formed on the inner surfaces of the arm 73, and the ring 64 is provided with positioning stops 76 to position the transfer arms 73 so that the ribs 72 will enter the grooves 71.

With this arrangement, the transfer members 61 are maintained in predetermined position, or relation, on the pad 62 and are removable therefrom, and returned thereto, by the transfer arms 73, the structure and operation of which will be hereinafter described.

The turret 19 is likewise formed with a plurality of radially extending arms 80 provided at their outer ends with mold carriers 81 adapted to receive and carry conventional molds 82 formed of plaster of Paris, or the like.

As the turrets 18, 19, are indexed in a clockwise direction, Figure 2, the transfer members 61 are successively moved from a loading station, as indicated at L, Figure 2, to a spreading station indicated at S, and thence to a transfer station T, and the mold carrying members 81 are likewise successively moved from a station A, where the molds with the jiggered ware thereon may be removed, and a fresh mold inserted in the carrier 81, to a station indicated at B where the clay bat is deposited, in inverted form, on the top surface of the mold, and thence to one or more jiggering stations J, J', and thence to the station A.

A blank or lump of clay 85, sometimes called a "pug," is placed upon a transfer member 61 at the station L, or the next succeeding station, Figure 2. As the turret 18 is indexed, the transfer member 61, with the blank 85 thereon, is moved to the spreading station S, and while the turret is at rest, a rotating spreading tool is moved downwardly into engagement with the blank 85, spreading or forming the blank into flat disk form, as indicated at 86, Figure 2. The spreading tool consists of a pair of radially extending blades 87 pivotally mounted at their inner ends to a rotating shaft 88 journalled in a bracket 89 carried by a hollow shaft slidably mounted in shaft 20.

After the blank 85 has been spread into the form of a bat 86, the turret 18 is indexed to position bat transfer member 61 at the station T, whereupon the transfer member is moved through an arc indicated by the dotted line 91, and the bat 86 is thrown, or deposited, upon the face of a mold 82 positioned at station B. Upon the next indexing of the turret 19 the mold, with the bat 86 thereon, is moved to the jiggering station J. In the formation of certain types of ware, one jiggering operation is sufficient. In other types, the jiggering is better performed by successive operations and the machine, as shown, includes two jiggering stations J and J'.

With this arrangement, the ware is partially jiggered at the station J, and the jiggering is finished at station J'. At each of these stations, a jiggering mechanism is arranged which consists of a pair of radially extending blades 92, see Figure 4, the lower edges of which are formed to the desired shape. The blades 92 are pivotally mounted at their inner ends to a plug member 93 secured to the lower end of a shaft 94 vertically journalled in a sleeve 95 adjustably mounted in a bracket 96 carried by a hollow shaft 97 slidably mounted in the turret shaft 28. The shaft 94 is rotated by a motor 98 through belt 99 which is trained over a pulley 100 mounted upon the motor shaft, and a pulley 101 mounted upon the upper end of shaft 94. The shaft 97, and the bracket 96 carried thereby, is moved vertically by a cam 102 which is engaged by a roller 103 carried on a bracket 104 secured to the lower end of shaft 97. The bracket 104 is formed with an arm 105, the outer end of which is provided with a slot to slidably engage a pin 106 depending from the plate 30. The purpose of the arm 105 and pin 106 is to prevent any rotary motion of shaft 97 while it is being moved up and down. When the cam 102 permits downward movement of shaft 97, and the jiggering mechanism carried thereby, the forming tools 92 are moved into engagement with the clay bat on the mold and, because these blades are rotating about the axis of shaft 94, the top surface of the bat is jiggered to form. It will, of course, be understood that the top surface of the mold forms the opposite side of the ware.

The blades 92 are pivotally connected, intermediate their ends, to depending arms 107 which are secured to a sleeve 108 slidably mounted upon the shaft 94, the sleeve being recessed as at 109 to receive the forked end of a lever 110 pivoted to the bracket 96, as at 111. The opposite end of the lever 110 is pivotally connected to a rod 112 depending from an arm 113 secured to the upper end of an inner shaft 114 which is slidably mounted in the shaft 97 and which is provided, at its lower end, with a bracket and roller 115 arranged to engage a cam 116 also mounted on shaft 40. The forked end of the lever 110 and accordingly, the sleeve 108 is normally maintained in up position by a tension spring 117 secured at one end to the arm 113 and at its opposite end to the bracket 96 and, in this position, the lower edges of the blades 92 do not extend in the same plane, but the outer ends of the blades are positioned slightly upward, as indicated in Figure 4.

The arrangement is such that the blades descend and engage the clay bat at their innermost ends and thereupon, roller 115 engages cam 116 causing the shaft 114 to be moved upwardly and sleeve 108 moved downwardly to position the lower edges of the forming tools 92 horizontally, or in the same plane, and at the completion of the jiggering operation the blades 92 are again moved about their pivot on shaft 94, whereupon the outer ends of the blades leave the clay first, and the separation is progressive across the face of the ware to the center thereof.

As previously stated, in the machine here shown, there are two jiggering stations and both jiggering mechanisms are identical except for the blade contours.

With the exception of the contour of the lower edges of the spreading blades 87, the spreading mechanism is also substantially the same as the jiggering mechanism. That is, the shaft carrying the bracket 89 has, mounted on its lower end, a cam follower 120 engaging a cam 121 on shaft 40 to effect vertical movement of the brackets 89, and the blades 87 are moved about the pivot at their inner ends to assume a horizontal position by an arrangement as described in connection with the jiggering mechanism, this pivotal movement of the blades 87 being effected by a follower 123 engaging the cam 124, the method of operation being similar to that described in connection with the jiggering mechanism. That is, the cam 121 functions to lower the blades 87 into engagement with the clay blank on the transfer member 61 and thereafter, the blades are moved to straight horizontal position by the cam 124.

It will be observed that the operator need only place the clay blank 85 on the transfer member 61, remove molds with jiggered ware thereon from the turret 19, and place empty molds thereon. While he is performing those operations, the clay blank is being spread to bat form, and the bats on the molds are being jiggered to final form, all whereby the operator is able, without exercising any additional effort, to materially increase the production of finished ware.

The movement of the transfer member 61 through the arcuate path 91 is effected by the arms 73 which are slidably mounted on a shaft 130 and rotatable therewith. The shaft 130 is journalled in a bracket 133 extending upwardly from the frame top 23. A pinion 134 is secured to one end of the shaft 130 and meshes with a gear 135 which has associated with it a crank arm 136 pivotally connected to a link 137 extending downwardly through the frame top and being connected at its lower end to a lever 138 pivoted intermediate its ends to a bracket 139 depending from the under side of the frame top. The link 137 is urged upwardly by tension spring 140 connected between the outer portion of lever 138 and the frame of the machine. The inner end of lever 138 is provided with a roller 142 engaging a cam 143 mounted upon shaft 40. This cam is formed with high lobes 145, 146, an intermediate section 147, and a lower section 148. One side of the cam is formed with a laterally extending projection 149 which is coextensive with the intermediate lobe 147 and which is engaged by a roller 150 also carried by lever 138.

As the cam 143 rotates in a clockwise direction Figure 8, the roller 142 engages the high portion 145, moving the link 137 downwardly effecting rotation of the gear 135 in a clockwise direction Figure 7, and rotating pinion 134 and shaft 130 in a counter-clockwise direction to lower the free ends of the arms 73 to position the same in proximity to the periphery of the transfer member 61. Upon further rotation of the cam 143, the roller 142 drops to the low section 148 of the cam, permitting the spring 140 to quickly move the link 137 upwardly and thus effect rapid counter-clockwise rotation of gear 135, and clockwise rotation of shaft 130, moving the outer ends of the arms through the arcuate path 91, Figure 1. This movement continues until the arms engage a stop member of yieldable material 152 supported by a bracket 153 mounted upon the bearing bracket 133. This stoppage of arms is abrupt and causes the spread bat, carried by the transfer member, to be inverted and thrown from the member onto the mold at the station B of turret 19. The arms are bent, as illustrated in Figure 1, whereby shaft 130 is positioned above the plane of the transfer member 61 on turret 18, and are in substantially horizontal position when they are moved into engagement with the transfer member on turret 18, and they are likewise in substantially horizontal arrangement when movement of the arms is stopped by the bumper 152. Inasmuch as the portion of the bat furthest from the axis of shaft 130 is traveling at a speed greater than the inner portion of the bat, the outer portion is released from the transfer member 61 first and descends faster than the rest of the bat, whereby the bat descends toward the mold 82 in an inclined position, as shown at 155, Figure 1. Accordingly, one edge of the bat strikes the mold first and then the bat progressively contacts the mold across the surface thereof and thus excludes air from between the bat and the face of the mold, this arrangement functioning in a manner similar to the bat being thrown onto the mold by a skilled operator.

As previously stated, the arms 73 are rotatable with the shaft 130, but are slidably mounted thereon. The hubs 156 of the arms are provided on their inner ends with circular collars 157 and with projections 158. A member 159 is pinned to the shaft and is positioned intermediate the projections 158, and carries in its end a transversely extending pin 160, the pin extending through apertures formed in the projections 158. Thus, the arms are rotatable with the shaft and are maintained in alinement. The arms are normally maintained in spaced apart relation by a compression spring 161 arranged in an aperture formed in the member 159 and engaging the confronting faces of the projections 158.

After the arms 73 have been moved into proximity to the transfer member on the turret 18, they are contracted to grip the member. This contraction of the arms is brought about by rollers 167 engaging the arcuate collars 157. Each of the rollers 167 is mounted upon a sliding member 168. These members are slidably mounted on a cross piece 169 forming part of the bracket 133. A vertically journalled shaft 170 extends through the cross member 169 and has secured to its upper end a rectangular member 171 having a pair of upwardly extending pins 172, each of which engage a notch in one of the sliding members 168, see Figure 11.

Figure 11:
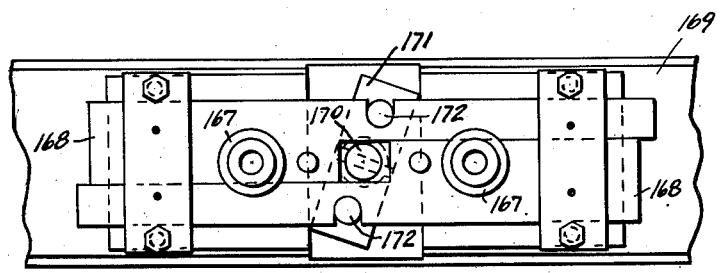
Figure 11 is a view, taken on line 11—11, Figure 8, illustrating the mechanism for contracting the arms shown in Figure 10.

When the shaft 170 is rotated in a counter-clockwise direction Figure 11, the members 168 are moved to effect separation of the rollers 167 and the spring 161 effects separation of the arms. Rotation, or oscillation, of the shaft 170 is brought about by a cam 175 mounted on shaft 40. An arm 176 is secured to the lower end of the shaft 170 and is provided with a roller 178 engaging cam 175. The position of the cam 175 on shaft 140, and the general arrangement is such that when the arms have been moved in a counter-clockwise direction, Figures 1 and 7, to a position in proximity to the transfer member 61, the shaft 170 is rotated in a clockwise direction, thus moving the rollers 167 inwardly toward the axis of the shaft 170 and causing the arms to be moved into engagement with the transfer member and the ribs 72 positioned in groove 71. This takes place while the roller 178 is in engagement with the lobe 179 on the cam 175, and the extent of lobe 179 is such that the arms are caused to grip the transfer member while it is moved through the arcuate path 91 to effect transfer of the bat 86 to the mold, and while the arms are moved in reverse direction to return the transfer member to the turret 18, whereupon the roller 178 reaches the end of the lobe 179 permitting spring 161 to separate the arms.

The arms are returned by upward movement of the link 137 by the lobe portion 146 of cam 143, whereupon the transfer member is released, as just stated, and the roller 142 thereupon descends on the intermediate portion 147 of the cam. This effects a partial rotation of the arms in a clockwise direction, Figures 1 and 7, to the position shown in Figure 1, and while the arms are maintained in this position by the lobe 147, both of the turrets 18, 19, are indexed.

Lubricant may be applied to the bat while it is being jiggered at the jiggering stations J, J', as by a spray nozzle 90, it being understood that the nozzles 90, at the spreading and jiggering stations, are turned on and off at the desired times by means of valves operated by cams which may be mounted upon the main shaft 40, such an arrangement being conventional in power operated jiggering machines.

For some types and sizes of the ware, it is preferable to mount the nozzles 90 on the jiggering mechanism, as illustrated in Figure 5, the nozzles there shown being of the atomizing type and being connected to an air supply line 200. In this instance, the shaft 94 is hollow, and the air supply line 200 is connected to a tube 201 extending axially of the shaft 94 and in spaced relation to the bore thereof. The tube 201 is connected, at its upper end, to the air line 200 by means of a rotary connection head 203 and at its lower end, the tube is connected to the nozzles 90 by laterally extending pipes 204. A tube 205 is positioned in the tube 201, and is connected at its upper end to a water supply line 206. At its lower end, the tube 205 is connected to the nozzles 90 by laterally extending pipes 207. The pipes 204, 207, extend through apertures in the side wall of the shaft 94 and through vertically extending slots in sleeve 108. When air is supplied under pressure to the line 200 and accordingly to the nozzles 90, the nozzles are effective to draw water through the line 206 and direct a spray upon the ware being jiggered. Preferably, one of the nozzles is directed toward the center of the ware, and the other nozzle directed toward the periphery of the ware.

A trimmer 208 is adjustably mounted on a bracket 209 secured to the plug member 93 at the lower end of the shaft 94 and provided with a T slot 210, the trimmer 208 being adjustably secured to the bracket by a clamping screw 211, whereby the trimmer may be adjusted toward and from the center of the shaft 94, so that it may be positioned to trim off the excess clay that forms on the periphery of the piece of ware 212. The bracket 209 is pivoted at 214 to the plug member 93, and is moved toward and from the mold 82 by an air operated arrangement consisting of a cylinder 215 secured to one of the arms 107, and in which is mounted a piston 216 connected to a link 217, the lower end of which is connected to the bracket 209. The piston and the bracket are yieldingly urged downward by a compression spring 218 and are moved upwardly when air is supplied to the lower end of the cylinder through the pipe 219 extending through the side wall of the shaft 94 and connecting with the passage between the tube 201 and the shaft, the upper end of this passage being connected to a second air line 220 by means of a rotatable connection 221. Air is supplied to the lines 200, 220, by valves 222, 223, operated by cams 224, 225, mounted upon shaft 40, the arrangement being such that air is supplied to the line 200 to effect a proper water spray on the ware 212 for the correct duration and the trimmer 208 is moved into trimming position at the proper time.

During the jiggering operations at the stations J, J', a shield is elevated around the molds 82 to prevent the excess clay from being thrown onto parts of the machine, or on finished ware at the adjacent station. These shields are in the nature of open ended cylindrical members 230 formed of sheet material. The shields 230 are of appreciably greater diameter than the molds 82 and are provided with depending side members 231, to the lower end of which are pivotally connected links 232, the opposite ends of which are pivotally connected to a vertically extending frame member 233. There is provided a shield member 230 at each jiggering station, and these members are secured together as at 236, see Figure 2, and there are a pair of the links 232 connected to the member 231 depending from each of the shields. This arrangement constitutes a parallelogram action, whereby the shields 230 are moved vertically. The lower links 232 are secured to a shaft 238 having secured to the inner end thereof an arm 239 provided with a roller engaging a cam 240 mounted upon shaft 40. The links 232, and accordingly the shields 230, are moved upwardly by a tension spring 242, Figure 6, and are moved downwardly by the lobe 243 engaging the roller of arm 239. The cam 240 is so positioned as to permit spring 242 to move the shields 230 vertically to the dotted line position, Figure 6, where they remain during the jiggering operation. The excess clay removed by the forming blades 92 and by the trimmer 208 falls through the shields and is collected in a receptacle 245.

In operation, the operator places the blank or pug 85 upon one of the transfer members at the loading station, the turrets 18, 19, are then indexed and the blank is spread at the spreading station S to a relatively thin disk or bat form. Upon the next indexing of the turrets, the bat arrives at the transfer station T and, while the turrets are at rest, the transfer mechanism operates, as described, to flip or throw the bat onto a mold at station B. This operation effects an inversion of the bat so that the smooth, slick, top surface of the bat is deposited on the face of the mold and in such manner that the air is excluded from between the bat and the mold. Upon the next indexing of the turrets, this bat is partially jiggered at station J and, on the next movement of the turret, the jiggering operation is completed at station J'. Upon a subsequent movement of the turret, the operator removes the mold 82 with the jiggered piece of ware 212 thereon, and places an empty mold in the mold carrier.

It will be observed that the spreading and jiggering operations are taking place while the operator is placing the clay blank on a transfer member, removing the mold with the completed ware, and inserting an empty mold in its place.

An important feature of the machine is that the bat is deposited upon the mold with the smooth surface next to the mold, as distinguished from automatic ware forming machines now in operation wherein the clay is initially spread, or the bat formed, directly on the mold and not subsequently removed therefrom and inverted.

Another feature of importance resides in the action of the spreading and jiggering tools in that one end of the tools first engages the clay and then progressively tools the clay radially of the ware, and in first retracting one end of the tools from the ware and subsequently retracting the rest of the tool progressively from the material.

Ware made on this machine is of improved quality over that made on other automatic ware forming machines, and closely equals that made by the hand jiggering method.

Our machine has the further advantage in minimizing mold wear which results from the molds being carried by non-rotating members. In conventional jiggering machines, where the mold is rotated, there is considerable slippage between the rotating chuck and the mold, which results in excessive wear on the plaster-of-Paris mold, and thus materially reduces the normal life of the mold.

What we claim is:

1. Apparatus of the type described including mechanism for spreading blanks of clay to bat form on a succession of transfer members, mechanism for successively moving said members through an arc to invert the same and deposit the bats on a succession of molds, mechanism operable to jigger the bats on said molds successively, and motion transmitting means for operating said mechanisms in timed relation.

2. Apparatus of the type described including mechanism for spreading blanks of clay to bat form on a succession of transfer members, mechanism for moving said transfer members successively through an arc to invert the same and deposit the bats on a succession of molds, jiggering mechanism operable to jigger the bats on successive molds, and motion transmitting means for operating said mechanisms and advancing said transfer members and molds in succession in timed relation.

3. Apparatus of the type described including a transfer station, a bat receiving station, means operable to successively present transfer members with bats thereon to said transfer station, and to successively present molds at said bat receiving station, transfer mechanism including a pair of arms pivotally mounted at like ends on an axis arranged intermediate said stations, and mechanism operable, in timed relation with the advancement of said transfer members and molds, for moving said arms into engagement with said transfer members successively, moving said arms about their pivot to position said transfer members inverted above the molds, effecting reverse movement of said arms to return said transfer members to said transfer station, and releasing said transfer members.

4. Apparatus of the type described including a spreading turret adapted to carry a plurality of transfer members, a jiggering turret adapted to carry a plurality of molds, motion transmitting means operable to index said turrets in timed relation so as to move said transfer members successively through a spreading station and a transfer station, and to move said molds successively through a bat receiving station, a jiggering station, and a discharge station, spreading means arranged at said spreading station and operable to spread a blank of clay to bat form on said transfer members, jiggering mechanism arranged at said jiggering station and operable to jigger the bat on the molds, mechanism operable to move said transfer members positioned at the transfer station through an arc to invert and deposit the spread bat on a mold at said bat receiving station, and motion transmitting means for operating said spreading, jiggering and transfer mechanisms and indexing said turrets all in timed relation.

5. Apparatus of the type described including a spreading turret and a jiggering turret, a plurality of transfer members detachably mounted on said spreading turret, a plurality of mold supports carried by said jiggering turret, said spreading turret being journalled on a vertical axis, said transfer members being movable successively through a spreading station and a transfer station upon rotation of said turret, said jiggering turret being journalled on a vertical axis, and the molds carried by said mold supports being movable through a bat receiving station, a jiggering station and a discharge station, spreading means operable at said spreading station to spread a blank of clay on a transfer member to bat form, jiggering means arranged at said jiggering station and operable to jigger the bat on a mold, bat transfer mechanism arranged intermediate said turrets and operable to move a transfer member positioned at said transfer station through an arc and deposit the bat carried by said transfer member onto a mold positioned at said bat receiving station, and motion transmitting means operable to index said turrets and actuate said transfer mechanism, spreading means and jiggering means in timed relation.

6. An apparatus for forming plastic clay including a support for the clay, a spindle journalled on a vertical axis above the support, means operable to effect rotation of the spindle, a forming blade pivotally mounted at its inner end on the lower end of the spindle on an axis extending perpendicular to the axis of the spindle, said blade extending radially outwardly from the axis of the spindle and being normally inclined upwardly from its pivot, and means operable to effect movement of said spindle during the rotation thereof towards said support to bring the inner end of said tool into engagement with the clay, and means operable independently of said last mentioned means to subsequently move said blade about its pivot to bring the remaining portion of the blade into contact with the clay progressively.

7. Apparatus for forming plastic clay including a support for the clay, a spindle journalled on a vertical axis above said support, a pair of forming blades pivotally mounted at their inner ends to said spindle, said blades being normally inclined upwardly from their pivots, means operable to effect rotation of said spindle and relative movement between said support and said spindle to bring the inner ends of said blades into contact with the clay, and means subsequently operable, during such rotation and independently of said last mentioned means, to move said blades about their pivots, and to bring the remaining portion of said blades progressively into contact with the clay.

8. Apparatus of the type described including mechanism for advancing a procession of transfer member supports, a transfer member detachably positioned on each of said supports, mechanism for advancing a procession of mould supports, a mould positioned on each of said mould supports, mechanism operable to spread a blank of clay to bat form on each of said transfer members successively, mechanism for successively moving said transfer members from their respective supports through an arc to invert the same and deposit the formed bats on said moulds successively, and return said transfer members to their supports, jiggering mechanism operable to jigger the bats on the moulds successively, and motion transmitting means for operating said mechanisms in timed relation.

9. Apparatus for jiggering plastic clay into finished form including a support for the clay, a forming blade positioned above said support with the inner end of the blade arranged in alinement with the axis of said support, and said blade extending radially outwardly from said axis, means operable to effect relative axial and rotatable movement between said support and said blade to effect engagement of the inner end of the blade and the clay, and means operable during such movement and independently of said last mentioned means to move the remaining portion of said blade into contact with the clay progressively from the inner end of the blade to the outer end thereof.

10. Apparatus for jiggering plastic clay into finished form including a support for the clay, a forming blade positioned above said support with the inner end of the blade arranged in alinement with the axis of said support, and said blade extending radially outwardly from said axis, means operable to effect relative axial and rotatable movement between said support and said blade to effect engagement of the inner end of the blade and the clay, and means operable during such movement and independently of said last mentioned means to move the remaining portion of said blade into contact with the clay progressively from the inner end thereof, and to subsequently move said blade out of contact with the clay progressively from the outer end of the blade inwardly.

CLIFFORD H. PARMELEE.
ARTHUR J. BRIGGS.

REFERENCES CITED

The following references are of record in the file of this patent:

UNITED STATES PATENTS

| Number | Name | Date |
| --- | --- | --- |
| 1,145,767 | Haney | July 6, 1915 |
| 1,395,161 | Strobl | Oct. 25, 1921 |
| 1,423,009 | Muckenhirn | July 18, 1922 |
| 1,430,309 | Kinnard | Sept. 26, 1922 |
| 2,167,386 | Kinnard | July 25, 1939 |
| 2,362,058 | Emerson | Nov. 7, 1944 |
| 2,409,221 | Miller | Oct. 15, 1946 |